United States Patent
Pan (10) Patent No.: US 8,633,630 B2
(45) Date of Patent: Jan. 21, 2014

(54) PERMANENT MAGNET ROTOR OF MOTOR

(75) Inventor: Mingpan Pan, Zhongshan (CN)

(73) Assignee: Zhongshan Broad-Ocean Motor Manufacturing Co., Ltd., Zhongshan (CN)

(*) Notice: Subject to any disclaimer, the term of this patent is extended or adjusted under 35 U.S.C. 154(b) by 51 days.

(21) Appl. No.: 13/406,516

(22) Filed: Feb. 27, 2012

(65) Prior Publication Data

US 2012/0181895 A1 Jul. 19, 2012

Related U.S. Application Data (63) Continuation of application No. PCT/CN2010/077259, filed on Sep. 25, 2010.

(30) Foreign Application Priority Data

Dec. 25, 2009 (CN) .......................... 2009 1 0214416

(51) Int. Cl.
*H02K 1/00* (2006.01)

(52) U.S. Cl.
USPC ............................... 310/216.001; 310/156.12

(58) Field of Classification Search
USPC ............. 310/156.01, 156.12–156.14, 156.56, 310/216.001, 216.074
See application file for complete search history.

(56) References Cited

U.S. PATENT DOCUMENTS

| | | | | |
|---|---|---|---|---|
| 4,543,506 A | * | 9/1985 | Kawada et al. | 310/156.59 |
| 4,631,807 A | * | 12/1986 | Kawada et al. | 29/598 |
| 5,010,266 A | * | 4/1991 | Uchida | 310/156.22 |
| 5,091,668 A | * | 2/1992 | Cuenot et al. | 310/156.61 |
| 5,157,297 A | * | 10/1992 | Uchida | 310/156.61 |
| 5,463,262 A | * | 10/1995 | Uchida | 310/156.61 |
| 5,886,441 A | * | 3/1999 | Uchida et al. | 310/156.57 |
| 5,939,810 A | * | 8/1999 | Uchida et al. | 310/156.57 |
| 6,441,528 B1 | * | 8/2002 | Uchida et al. | 310/216.001 |

* cited by examiner

*Primary Examiner* — Thanh Lam
(74) *Attorney, Agent, or Firm* — Matthias Scholl P.C.; Matthias Scholl (57) ABSTRACT

A permanent magnet rotor of a motor including a rotor core and permanent magnets. The rotor core includes a central core, a plurality of sectional cores, and a connecting mechanism. The sectional cores are integrated with the central core via the connecting mechanism to form a whole iron core. Grooves are formed between each sectional core and the central core and the permanent magnets are embedded in the grooves. The permanent magnet rotor has a simple structure, excellent manufacturability in terms of production and assembly, low manufacturing costs, excellent electromagnetic performance, and meanwhile is robust enough to avoid potential deformation.

11 Claims, 11 Drawing Sheets

PERMANENT MAGNET ROTOR OF MOTOR

CROSS-REFERENCE TO RELATED APPLICATIONS

This application is a continuation of International Patent Application No. PCT/CN2010/077259 with an international filing date of Sep. 25, 2010, designating the United States, now pending, and further claims foreign priority benefits to Chinese Patent Application No. 200910214416.2 filed Dec. 25, 2009. The contents of all of the aforementioned applications, including any intervening amendments thereto, are incorporated herein by reference.

BACKGROUND OF THE INVENTION

1. Field of the Invention

The invention relates to a permanent magnet rotor of a motor.

2. Description of the Related Art

Figure 1:
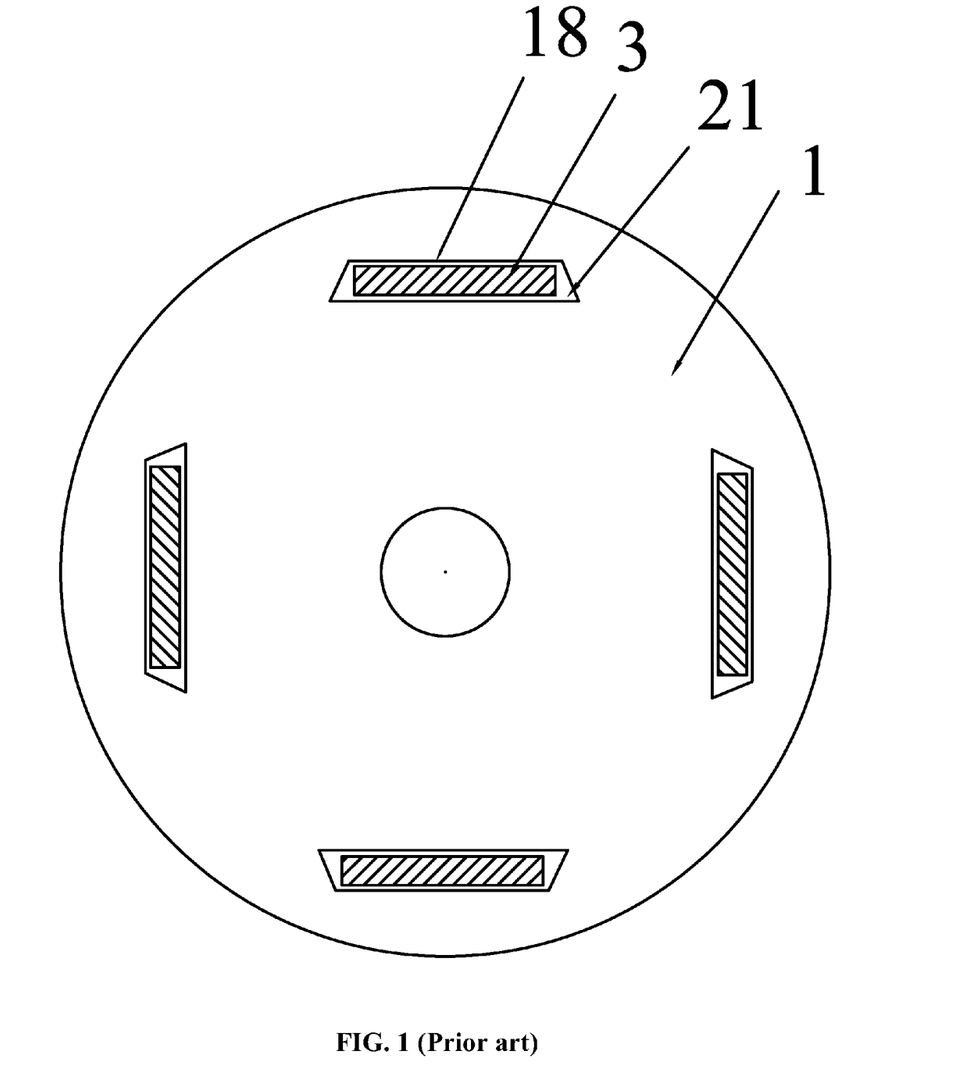
FIG. 1 is a schematic diagram of a permanent magnet rotor of a motor in the art.
Figure 2:
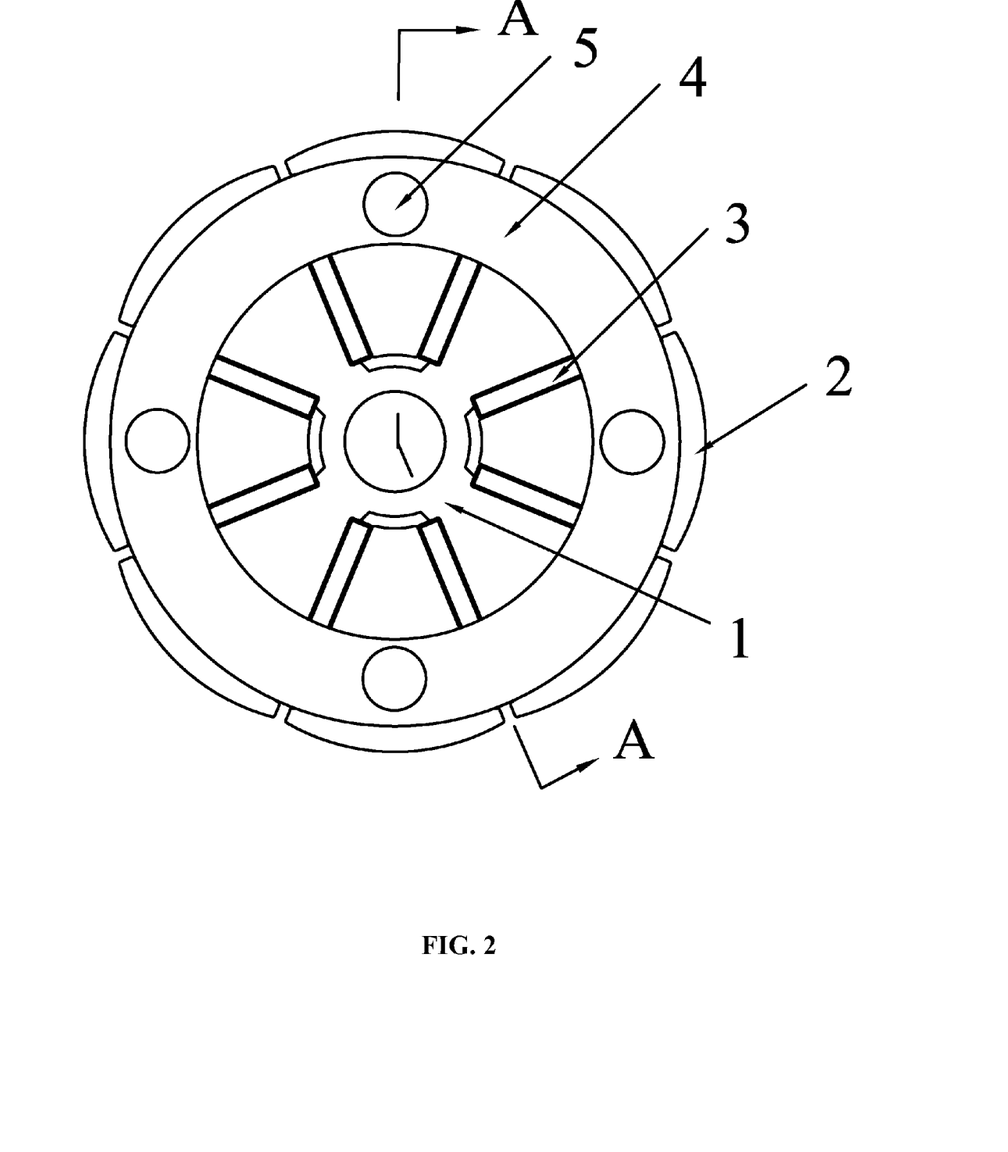
FIG. 2 is a front view of a permanent magnet rotor in accordance with one embodiment of the invention.
Figure 3:
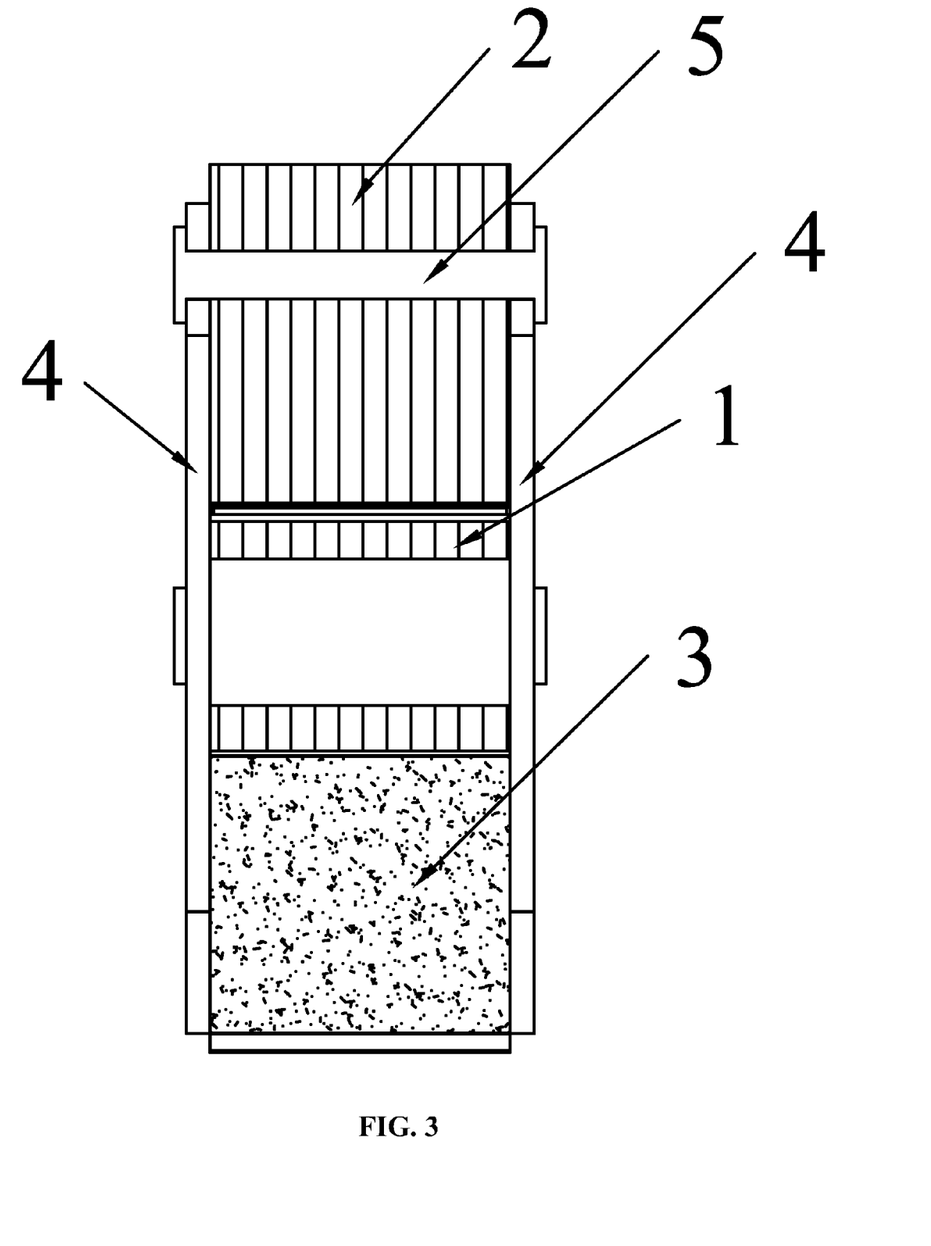
FIG. 3 is a sectional view of FIG. 2 taken from the line A-A.
Figure 4:
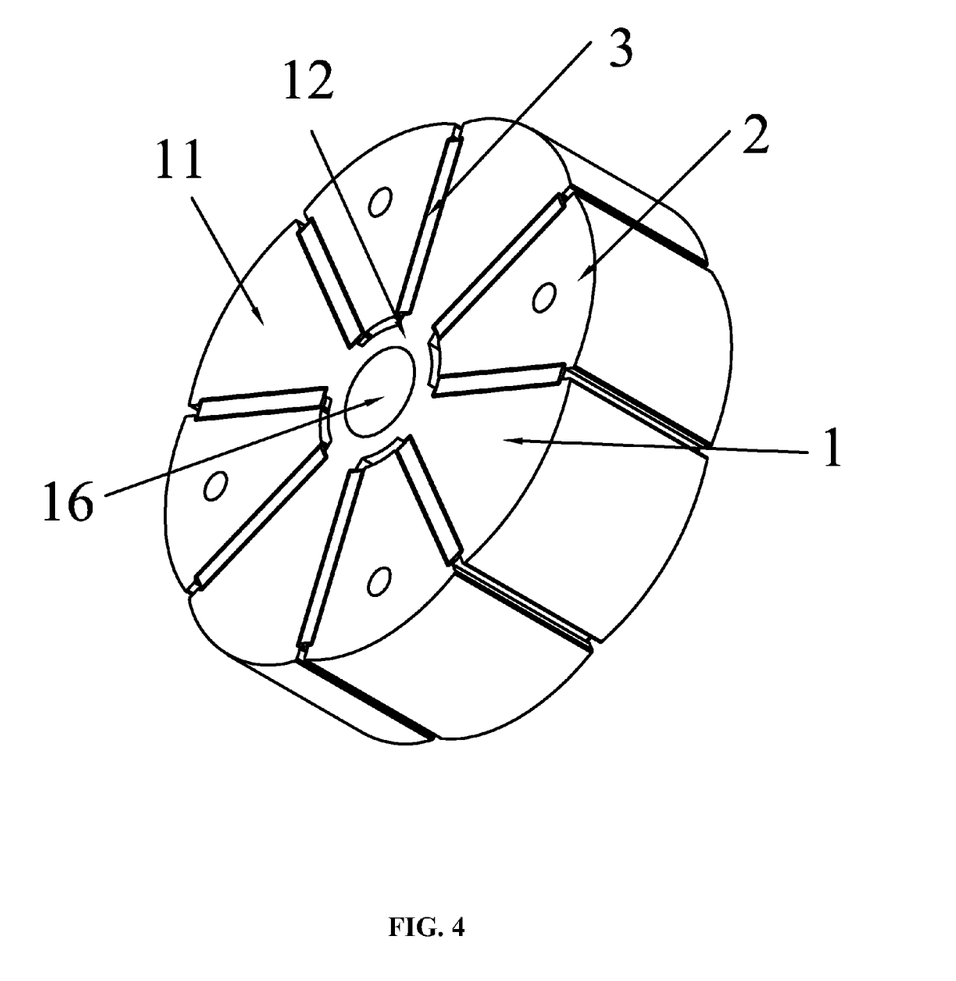
FIG. 4 is a three-dimensional diagram of a permanent magnet rotor without end rings in accordance with one embodiment of the invention.
Figure 5:
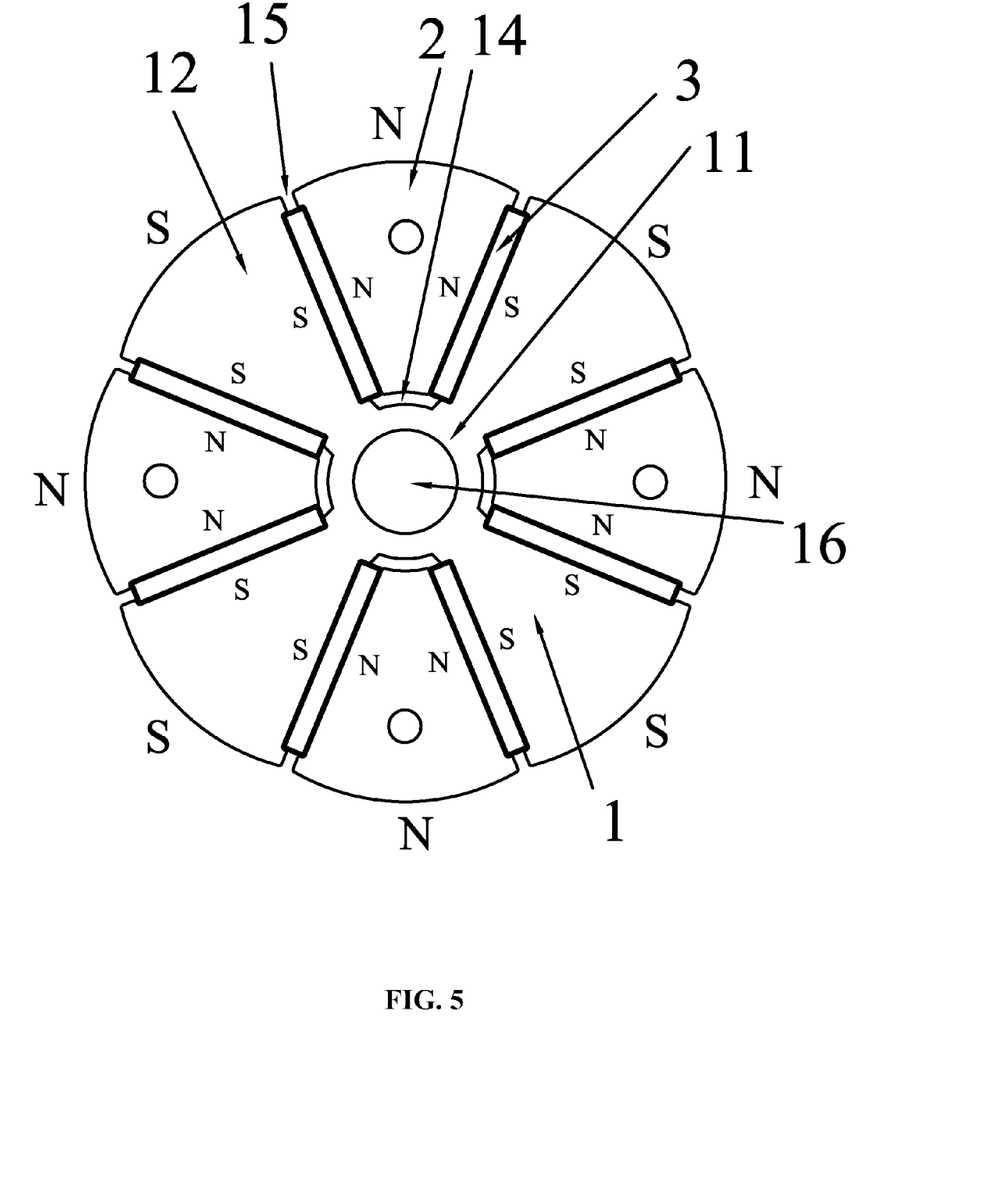
FIG. 5 is an orthogonal projection view of FIG. 4.
Figure 6:
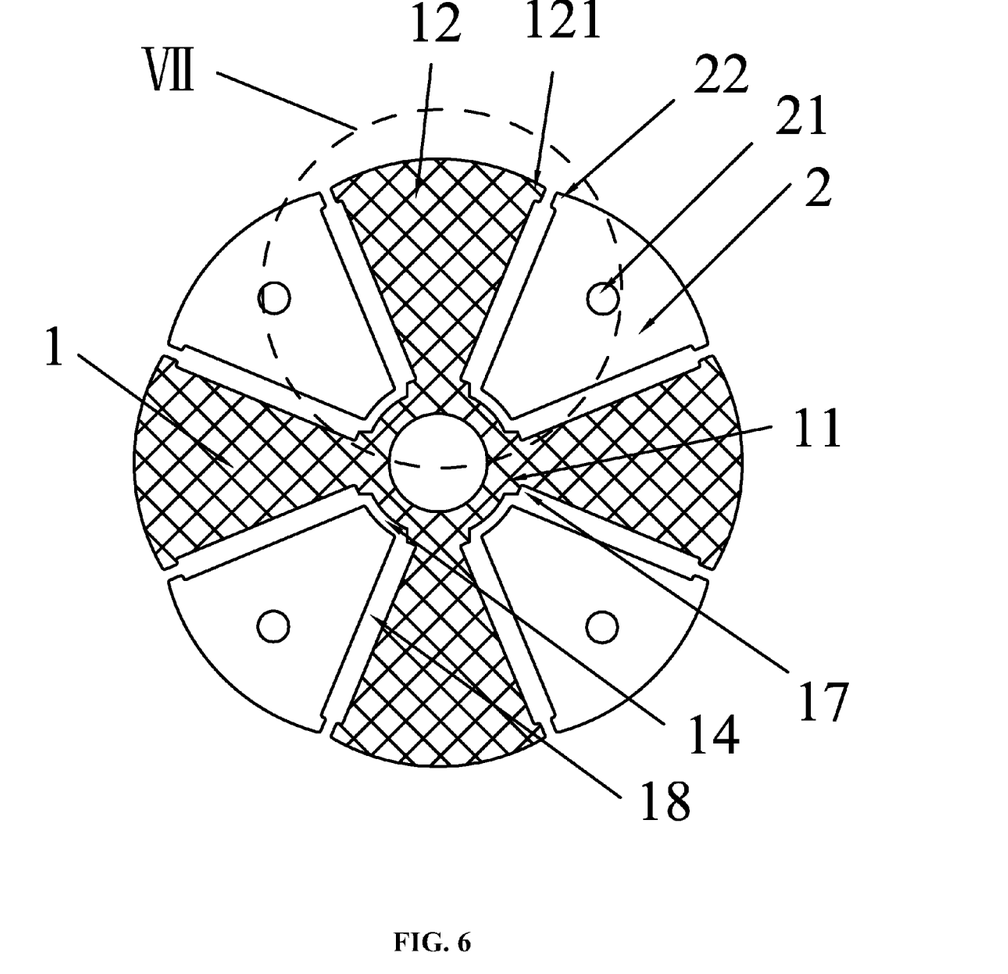
FIG. 6 is a schematic diagram of FIG. 5 without permanent magnets.
Figure 7:
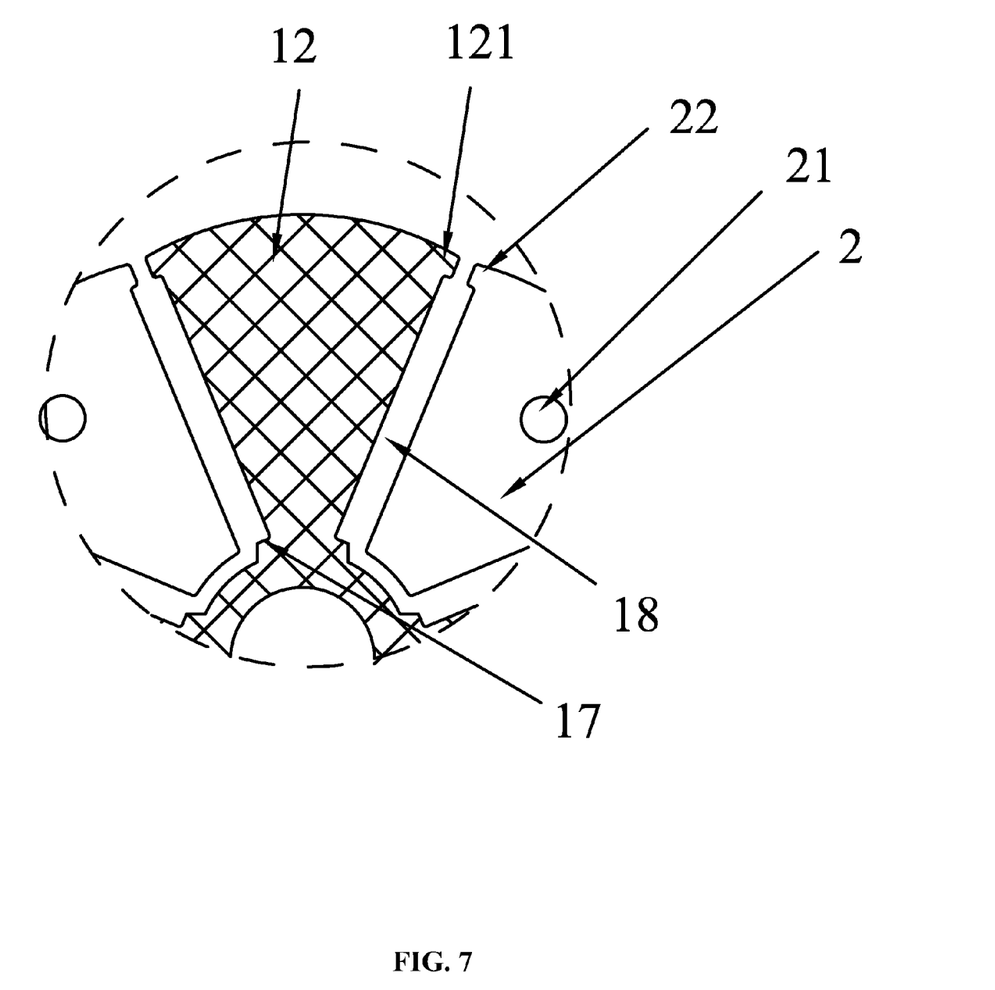
FIG. 7 is an enlarged view of FIG. 6 taken from the line B-B.
Figure 8:
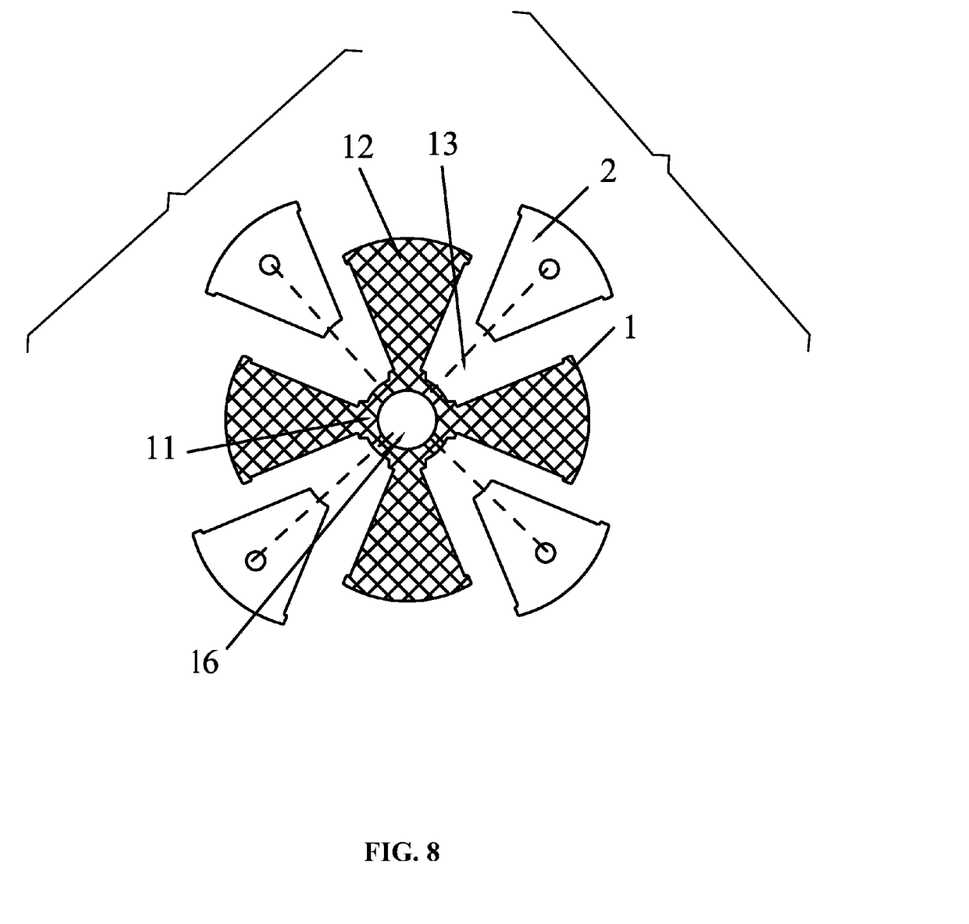
FIG. 8 is an assembly diagram of sectional cores and a central core of a permanent magnet rotor in accordance with one embodiment of the invention.
Figure 9:
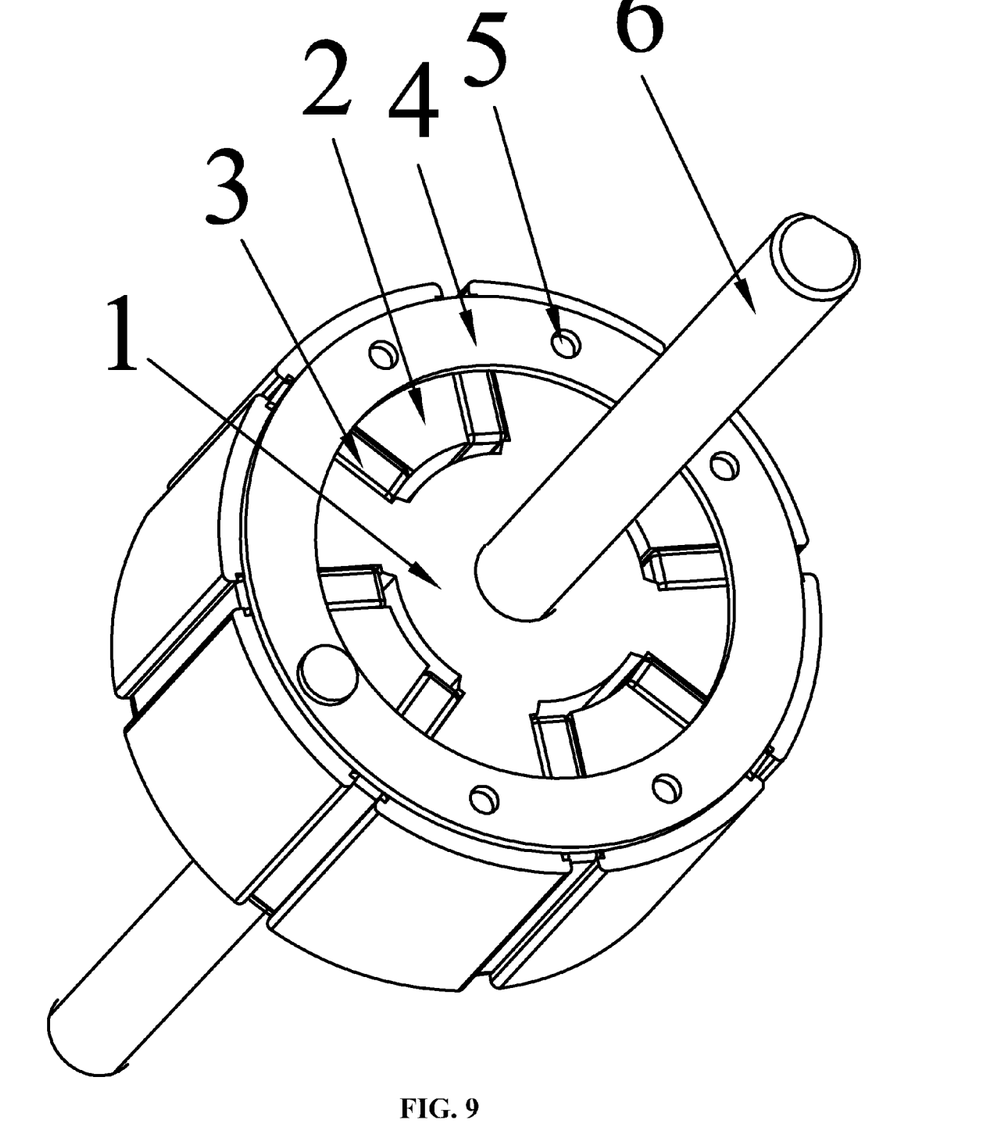
FIG. 9 is a three-dimensional diagram of a permanent magnet rotor in accordance with one embodiment of the invention.

As shown in FIG. 1, grooves 18 are usually disposed in an iron core 1 to hold tegular magnets for a conventional permanent magnet rotor and a narrow edge 21 is disposed at the two ends of each groove 18 and at the rotor periphery. Although magnetic short circuits are reduced by magnetic circuit saturation, they cannot be completely eliminated. For further reasons that the narrower edge is more preferred to avoid the magnetic short circuits, rotor laminations are difficult to be made, the narrow edge 21 is likely to deform to make it difficult for the tegular magnet to be inserted in the groove, and moreover the tegular magnet needs to be finely finished before being inserted in the groove; if the groove is too small, the tegular magnet cannot be inserted; if the groove is too big, a gap would occur, leading to the increased magnetic pressure drop, therefore the manufacturability is poor, the assembly speed is slow, product quality is hardly to be guaranteed, and the electromagnetic performance is unsatisfactory.

SUMMARY OF THE INVENTION

In view of the above-described problems, it is one objective of the invention to provide a permanent magnet rotor of a motor that has a simple structure, excellent manufacturability in terms of production and assembly, low manufacturing costs, excellent electromagnetic performance, and meanwhile it is robust enough to avoid potential deformation.

To achieve the above objective, in accordance with one embodiment of the invention, there provided is a permanent magnet rotor of a motor, comprising a rotor core and permanent magnets, wherein the rotor core comprises a central core, a plurality of sectional cores, and a connecting mechanism; the sectional cores are integrated with the central core via the connecting mechanism to form a whole iron core; grooves are formed between each sectional core and the central core and the permanent magnets are embedded in the grooves.

In a class of this embodiment, the grooves and the permanent magnets are distributed in the radial direction and the grooves are evenly distributed along the circumference of the rotor.

In a class of this embodiment, the central core comprises an annular central seat and a plurality of fixed core blocks extending therefrom. A cavity is formed between two adjacent fixed core blocks with each sectional core embedded therein. The grooves are formed between each sectional core and each fixed core block for receiving the permanent magnet.

In a class of this embodiment, the sectional cores and the fixed core blocks are both in the shape of a sector and the surface of either the pole N or the pole S of the permanent magnets is a plane surface.

In a class of this embodiment, at both ends of each groove are disposed with apertures, which make the pole N to be fully apart from the pole S of each permanent magnet that is embedded in the groove.

In a class of this embodiment, the whole central core has the same magnetic polarity and all sectional cores have the opposite magnetic polarity as the whole central core.

In a class of this embodiment, the pole N and the pole S of the sectional cores and the fixed core blocks are alternately distributed. The surface of the pole N or the pole S of each permanent magnet attaches to the side surface of each sectional core or each fixed core block.

In a class of this embodiment, a bore is disposed in the annular central seat.

In a class of this embodiment, the connecting mechanism comprises end rings that are disposed at both ends of the rotor core, at the corresponding positions of each end ring and each sectional core are disposed with a through hole and a rivet extends through the through hole to connect the end rings, the sectional core, and the central core together.

In a class of this embodiment, a rotating shaft of the motor is coupled with the annular central seat via a damping device. The damping device comprises pins and a shock ring. The rotating shaft is sheathed with an inner core and the inner core is embedded in the bore inside the annular central seat. A gap is formed between the inner core and the annular central seat. On the outer surface of the inner core and at the corresponding position on the inner wall of the bore are disposed with a plurality of recesses. The shock ring is embedded in the gap and the recesses. The shock ring in the recesses is disposed with bores, and the pins are embedded in the bores.

In a class of this embodiment, on two ends of the permanent magnet are disposed with a step and a boss, respectively.

In accordance with another embodiment of the invention, there provided is a permanent magnet rotor of a motor, comprising a rotor core and permanent magnets, wherein the rotor core comprises a central core, a plurality of sectional cores, and a connecting mechanism; the sectional cores are integrated with the central core via the connecting mechanism to form a whole iron core. The central core comprises an annular central seat and a plurality of fixed core blocks extending therefrom. A cavity is formed between two adjacent fixed core blocks with each sectional core embedded therein. Grooves are formed between each sectional core and the central core and the permanent magnets are embedded in the grooves.

In a class of this embodiment, the connecting mechanism comprises end rings that are disposed at both ends of the rotor core, at the corresponding positions of each end ring and each sectional core are disposed with a through hole and a rivet extends through the through hole to connect the end rings, the sectional core, and the central core together.

In a class of this embodiment, at both ends of each groove are disposed with apertures, which make the pole N to be fully apart from the pole S of each permanent magnet that is embedded in the groove.

In a class of this embodiment, the permanent magnets at both sides of the same sectional core have the same magnetic polarity, i.e. they are either the pole N or the pole S at the same time. The permanent magnets at both sides of the same fixed core blocks have the same magnetic polarity, i.e. they are either the pole N or the pole S at the same time. All sectional cores form the same magnetic polarity. The magnetic polarity of the sectional cores and the fixed core blocks are alternately distributed according to the poles N and S.

Advantages of the invention are summarized below:
1. The rotor core comprises a central core, a plurality of sectional cores, and a connecting mechanism by which the sectional cores are integrated with the central core to form a whole iron core. Each permanent magnet is clamped in a groove formed between each sectional core and the central core. Such a structure is simple and low in manufacturing costs as well as it has excellent manufacturability in terms of production and assembly.
2. A plurality of grooves and the permanent magnets are distributed in the radial direction and the grooves are evenly distributed along the circumference of the rotor. Such a structure is robust enough to avoid potential deformation and has excellent electromagnetic performance. At both ends of each groove are disposed with apertures, which make the pole N to be fully apart from the pole S of each permanent magnet that is embedded in the groove. In this way, magnetic short circuits are completely prevented, magnet utilization ratio is increased, and the electromagnetic performance is further improved.
3. The rotor core comprises a central core having the same magnetic polarity within the whole magnetic circuit and all separated sectional cores have the opposite magnetic polarity. Such a structure is simple, reasonable, reliable, production friendly, and meanwhile it has excellent manufacturability. The intended magnetic field waveform can be formed by changing the height of the rotor periphery.
4. The permanent magnets are distributed in the radial direction. The induced magnetic field generated by the stator winding closes via the iron core rather than the permanent magnets, so that a part of the magnetic resistance is reduced. Moreover, such a structure may function to increase the torque and the electromagnetic performance is improved by using the embedded permanent magnets instead of the conventional narrow edges to avoid the short circuits.
5. The connecting mechanism comprises end rings that are disposed at both ends of the rotor core, at the corresponding positions of end rings and sectional core is disposed with a through hole and a rivet extends through the through hole to connect the end rings, the sectional core, and the central core together. Such a structure is simple, highly integrated and robust enough to avoid potential deformation. The whole rotor has no fragile parts and the reliability is improved.
6. The rotating shaft is connected with the annular central seat of the central core via a damping device, which comprises pins and a shock ring. Thus vibration can be effectively reduced to enable the rotor to work stably.

DETAILED DESCRIPTION OF THE EMBODIMENTS

For further illustrating the invention, experiments detailing a permanent magnet rotor of a motor are described below. It should be noted that the following examples are intended to describe and not to limit the invention.

Example 1

As shown in FIGS. 1-9, a permanent magnet rotor of a motor comprises a rotor core and permanent magnets 3, in which the permanent magnets 3 are embedded in the rotor core. The rotor core comprises a central core 1, a plurality of sectional cores 2, and a connecting mechanism. The sectional cores 2 are integrated with the central core 1 via the connecting mechanism to form a whole iron core. Each permanent magnet 3 is clamped in a groove 18 formed between each sectional core 2 and the central core 1. A plurality of grooves 18 and the permanent magnets 3 are distributed in the radial direction and the grooves 18 are evenly distributed along the circumference of the rotor. The central core 1 comprises an annular central seat 11 and a plurality of fixed core blocks 12 extending therefrom. A cavity 13 is formed between two adjacent fixed core blocks 12 with each sectional core 2 embedded therein. The grooves 18 are formed between each sectional core 2 and each fixed core block 12 for receiving the permanent magnet 3. The sectional cores 2 and the fixed core blocks 12 are both in the shape of a sector and the surface of either the pole N or the pole S of the permanent magnets 3 is a plane surface. At both ends of each groove 18 are disposed with an aperture 14 and an aperture 15, which make the pole N to be fully apart from the pole S of each permanent magnet 3 that is embedded in the groove 18. The whole central core 1 has the same magnetic polarity and all sectional cores 2 have the opposite magnetic polarity as the central core 1. The pole N and the pole S of the sectional cores 2 and the fixed core blocks 12 are alternately distributed. The surface of the pole N or the pole S of each permanent magnet 3 attaches to the side surface of each sectional core 2 or each fixed core block 12. A bore 16 is disposed in the annular central seat 11. The connecting mechanism comprises end rings 4 that are disposed at both ends of the rotor core, at the corresponding positions of each end ring 4 and each sectional core 2 are disposed with a through hole 21 and a rivet 5 extends through the through hole 21 to connect the end rings 4, the sectional core 2, and the central core 1 together. A rotating shaft 6 of the motor is directly sheathed in the bore 16 inside the annular central seat 11.

Example 2

Figure 10:
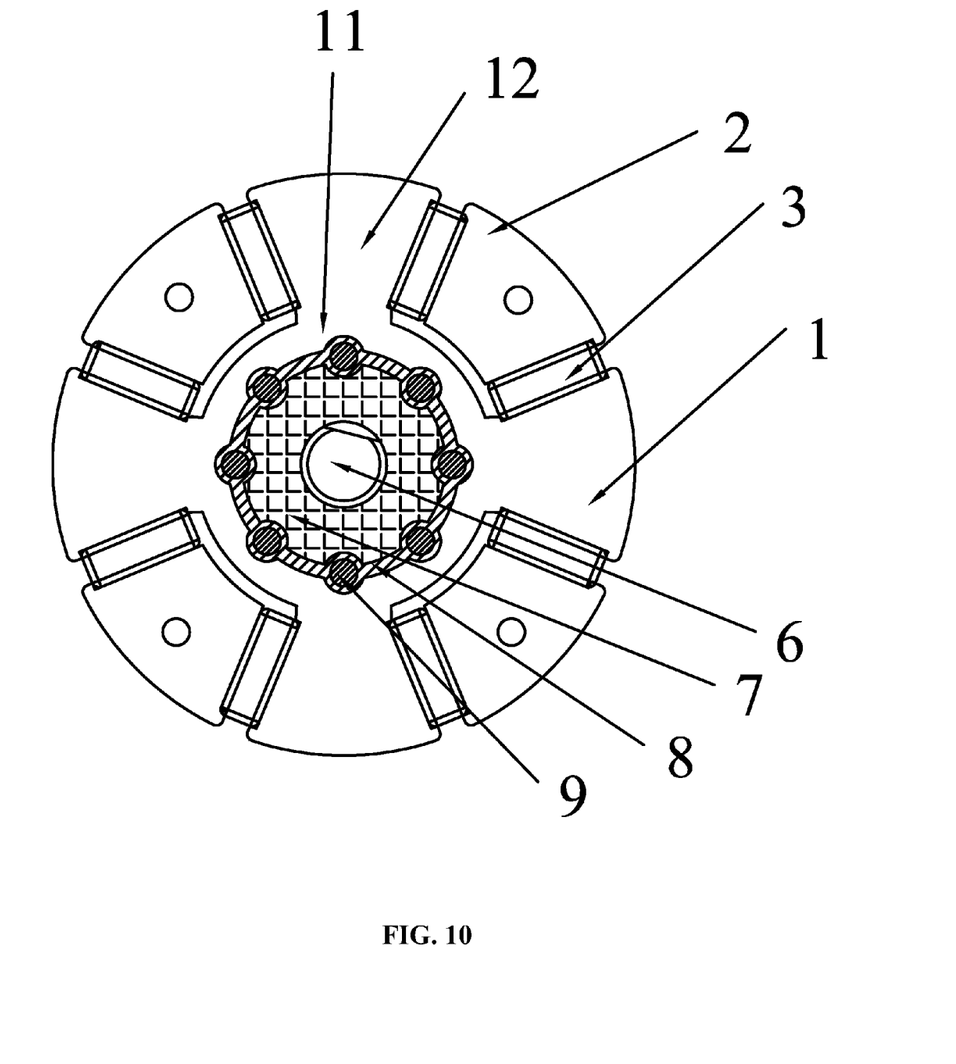
FIG. 10 is a sectional view of a permanent magnet rotor in accordance with another embodiment of the invention.
Figure 11:
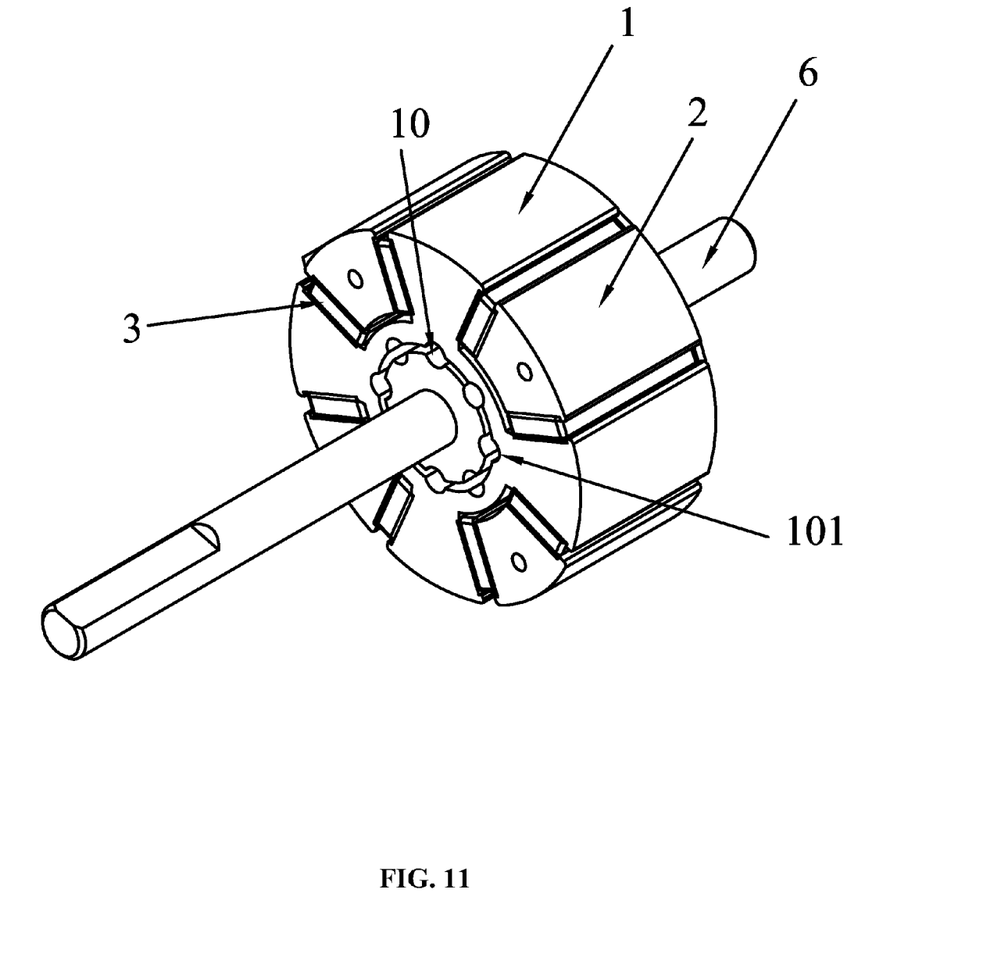
FIG. 11 is a three-dimensional diagram of a permanent magnet rotor without a shockproof rubber ring and pins in accordance with another embodiment of the invention.

Following Example 1 except that the rotating shaft 6 is coupled with the annular central seat 11 via a damping device.

The damping device comprises pins 8 and a shock ring 9. The rotating shaft 6 is sheathed with an inner core 7 and the inner core 7 is embedded in the bore 16 inside the annular central seat 11. A gap 10 is formed between the inner core 7 and the annular central seat 11. On the outer surface of the inner core 7 and at the corresponding position on the inner wall of the bore 16 are disposed with a plurality of recesses 101, and the shock ring 9 is embedded in the gap 10 and the recesses 101. The shock ring 9 in the recesses 101 are disposed with bores, and the pins 8 are embedded in the bores. The damping device disposed between the rotating shaft and the stator core can effectively reduce vibration to enable the rotor to work stably.

The rotor core used in the invention comprises a central core 1, a plurality of sectional cores 2 and a connecting mechanism by which the sectional cores 2 are integrated with the central core 1 to form a whole iron core. Each permanent magnet 3 is clamped in a groove 18 formed between each sectional core 2 and the central core 1. Such a structure is simple and low in manufacturing costs, and meanwhile it has excellent manufacturability in terms of production and assembly. The grooves 18 and the permanent magnets 3 are distributed in the radial direction and the grooves 18 are evenly distributed along the circumference of the rotor. Such a structure is robust enough to avoid potential deformation and has excellent electromagnetic performance. At both ends of each groove 18 are disposed with apertures, which make the pole N to be fully apart from the pole S of each permanent magnet 3 that is embedded in the groove 18. In this way, magnetic short circuits are completely prevented, magnet utilization ratio is increased and the electromagnetic performance is further improved. The rotor core comprises a central core 1 having the same magnetic polarity within the whole magnetic circuit and all separated sectional cores 2 have the opposite magnetic polarity. Such a structure is simple, reasonable, reliable, production friendly, and meanwhile it has excellent manufacturability. The intended magnetic field waveform can be formed by changing the height of the rotor periphery. The connecting mechanism comprises end rings 4 that are disposed at the two ends of the rotor core; a rivet 5 extends through each through hole to connect the end rings 4, the sectional core 2, and the central core 1 together. Such a structure is simple, highly integrated and robust enough to avoid potential deformation. The whole rotor has no fragile parts and the reliability is improved.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A permanent magnet rotor of a motor, comprising:
    a) a rotor core; and
    b) permanent magnets;
wherein:
   the rotor core comprises a central core, a plurality of sectional cores, and a connecting mechanism;
   the sectional cores are integrated with the central core via the connecting mechanism to form a whole iron core;
   grooves are formed between each sectional core and the central core and the permanent magnets are embedded in the grooves;
   the grooves and the permanent magnets are distributed in the radial direction and the grooves are evenly distributed along the circumference of the rotor;
   the central core comprises an annular central seat and a plurality of fixed core blocks extending therefrom;
   a cavity is formed between two adjacent fixed core blocks;
   each sectional core is embedded in the cavity;
   a rotating shaft of the motor is coupled with the annular central seat via a damping device;
   the damping device comprises pins and a shock ring;
   the rotating shaft is sheathed with an inner core and the inner core is embedded in the bore inside the annular central seat;
   a gap is formed between the inner core and the annular central seat;
   on the outer surface of the inner core and at the corresponding position on the inner wall of the bore are disposed with a plurality of recesses;
   the shock ring is embedded in the gap and the recesses; and
   the shock ring in the recesses is disposed with bores, and the pins are embedded in the bores.

2. The permanent magnet rotor of claim 1, wherein the sectional cores and the fixed core blocks are both in the shape of a sector and the surface of either the pole N or the pole S of the permanent magnets is a plane surface.

3. The permanent magnet rotor of claim 1, wherein at both ends of each groove are disposed with apertures which make the pole N to be fully apart from the pole S of each permanent magnet embedded in the groove.

4. The permanent magnet rotor of claim 3, wherein
   the connecting mechanism comprises end rings disposed at both ends of the rotor core;
   at the corresponding positions of each end ring and each sectional core are disposed with a through hole; and
   a rivet extends through the through hole to connect the end rings, the sectional core, and the central core together.

5. The permanent magnet rotor of claim 1, wherein the whole central core has the same magnetic polarity and all sectional cores have the opposite magnetic polarity as the whole central core.

6. The permanent magnet rotor of claim 5, wherein
   the pole N and the pole S of the sectional cores and the fixed core blocks are alternately distributed; and
   the surface of the pole N or the pole S of each permanent magnet attaches to the side surface of each sectional core or each fixed core block.

7. The permanent magnet rotor of claim 5, wherein a bore is disposed in the annular central seat.

8. The permanent magnet rotor of claim 1, wherein on two ends of the permanent magnet are disposed with a step and a boss, respectively.

9. The permanent magnet rotor of claim 1, wherein
   the connecting mechanism comprises end rings that are disposed at both ends of the rotor core;
   at the corresponding positions of each end ring and each sectional core are disposed with a through hole; and
   a rivet extends through the through hole to connect the end rings, the sectional core, and the central core together.

10. The permanent magnet rotor of claim 9, wherein
    the permanent magnets at both sides of the same sectional core have the same magnetic polarity;
    the permanent magnets at both sides of the same fixed core blocks have the same magnetic polarity;
    all sectional cores form the same magnetic polarity; and
    the magnetic polarity of the sectional cores and the fixed core blocks are alternately distributed according to the poles N and S.

11. The permanent magnet rotor of claim 1, wherein
    the permanent magnets at both sides of the same sectional core have the same magnetic polarity;

the permanent magnets at both sides of the same fixed core blocks have the same magnetic polarity;

all sectional cores form the same magnetic polarity; and the magnetic polarity of the sectional cores and the fixed core blocks are alternately distributed according to the poles N and S.

* * * * *